UNITED STATES PATENT OFFICE.

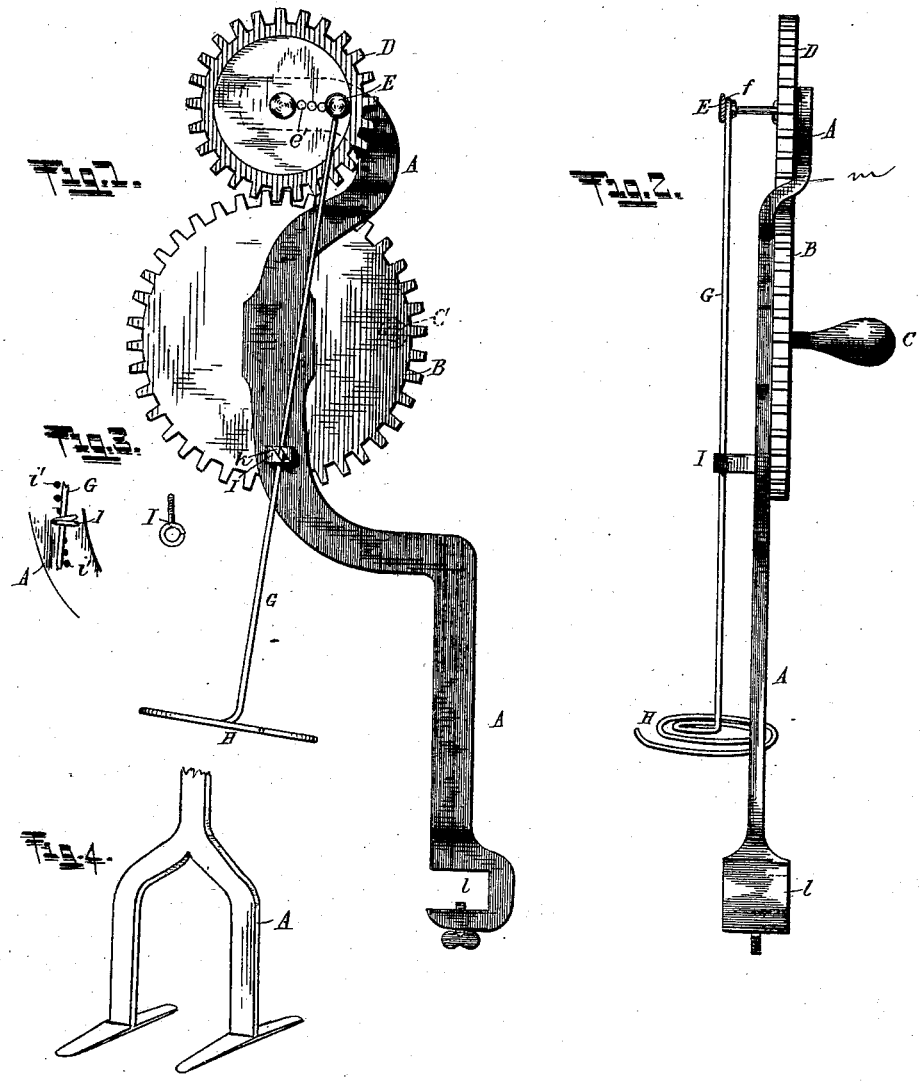

DAVID T. WINTER, OF PEABODY, MASSACHUSETTS.

EGG-BEATER.

SPECIFICATION forming part of Letters Patent No. 372,282, dated October 25, 1887.

Application filed February 14, 1887. Serial No. 227,597. (No model.)

*To all whom it may concern:*

Be it known that I, DAVID T. WINTER, of Peabody, in the county of Essex and State of Massachusetts, have invented certain new and useful Improvements in Egg-Beaters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention consists in a special construction, which will clearly appear from the following description.

In the drawings, Figure 1 represents in elevation an egg-beater embodying my invention; Fig. 2, a side view of same; Fig. 3, a slight variation, and Fig. 4 a modification of the frame as made with legs instead of with a clamp.

Upon one side of a frame or support, A, is mounted a large gear-wheel, B, having a suitable handle, C, for driving the same, and on the other side of the frame is a small gear, D, which engages with and is driven by the gear B. A bend, $m$, is made in the frame to permit this arrangement of these gears. As these two gears engage with each other, and the dasher or beater is on the side of the frame opposite the driving-handle C, and is driven by a pin, as presently stated, on the upper small gear, D, these gears need to be on opposite sides of the frame, so that the dasher-rod and handle C shall not interfere with each other. The bend $m$ is so shaped, as shown, that although the gears are mounted on opposite sides of the frame, yet they are in the same plane and their peripheral teeth engage together. On this smaller gear I either cast or secure a crank-pin or arbor, E, set eccentrically or near the circumference of the gear, and to this pin or arbor is hung, by an eye, $f$, the plunger-rod G of the coiled dasher or beater wire H, and this rod G, as shown, projects and plays up and down and swings through a regulating eye or opening in a guide-piece, I, which is either made integral with the frame or, preferably, in a removable and adjustable piece, which may be secured in any one of a series of holes, $i'$, (see Fig. 3,) and the opening in this piece I should be large enough to offer no obstruction to the rise and fall of the rod and its attached horizontally-coiled dasher. The arbor E may also be a set-screw, and made adjustable by screwing or otherwise inserting it in any one of the series of holes $e'$ on wheel D.

This vibratory dasher H consists of a single stiff wire coil, preferably coiled substantially or nearly in a plane and at right angles to the rod G, and having its outer end free and not attached to any other rod or device. It is made of the same piece of wire which constitutes the rod G, and when in place for action it lies nearly or substantially in a horizontal plane, and in its motions has no fixed guiding-rod of any sort, but has its movements imparted and controlled only by the agency of its rising and falling and laterally-swinging rod G, and this rod is actuated only by the pin E, and controlled and guided only by the piece I, which thus becomes a bearing-guide, and serves as a changeable fulcrum-point for the rod, the rod being in fact a lever, the power being at pin E, the dasher H representing the weight, and the sides of hole I being the fulcrum or bearing point, but which, by means of the rise and fall, and of the side play of the rod, bears always (when the dasher is moved) upon a different part of the rod, so that the operative length of the arms of the rod in action are constantly changing. The effect of this action is that there is no mere vertical reciprocation of the dasher H in right lines only, and there is no mere vibratory action; but while it always remains in substantially a horizontal position, yet it describes a path nearly circular or approximately egg-shaped, inasmuch as the arc described by it when at its lowest point will be that of a somewhat larger circle than when at its highest point, because of the varying leverage of the lower arm. In other words, although the pin E describes a true circle, the lifting and lowering of the dasher H while it is being revolved in a vertical plane varies its path from a true circle to the extent due to its up and down motion and to its slight side play in the bearing afforded by the hole in the guide-piece I.

It will be observed that I dispense with all springs, guide-rods, or adjuncts for the coiled dasher.

The part G H, I prefer to make from a piece of sixteen-gage hard wire (springy) and bend its lower end into three or four horizontal coils of, say, about half an inch apart. A thicker and more rigid wire may be used and work well; but I find that by having it a little springy the part G gets a vibratory action due to this springiness, which materially enhances the action of beating. The coil may be of oval or other shape than a true spiral, nor need the coils be all on the same plane, or each coil may be irregular.

The adjustment of the regulating-eye I to different heights adapts the apparatus for beating either large or small quantities at will by increasing or diminishing the side-sweep of the coil or dasher. The coil is lifted bodily through the egg for half of its circular path, and is plunged down and back with the same kind of motion through the other half of its path, but upon the opposite side of the vessel containing the egg, thus acting on all the egg. The horizontal form of the coil also prevents any portion of it being inoperative when in action by being lifted out of the egg. The adjustment of the crank-pin E also allows of a greater or less movement or throw of the beater, and I prefer to make it with a large head having milled edges, removable like a thumb-screw. Then, with a regulator, I, Figs. 1 and 2, cast on the frame, and having a diagonal saw cut, k, made in it, the dasher-rod can be removed by unscrewing the thumb-screw and shifting the rod until it can be pulled out through the cut k. Instead of a cast eye, an inclosed spiral one of wire may be used. (See Fig. 3.)

Evidently, like many other egg-beaters, this one may be used for beating other articles. It may, if desired, be made with legs, (see Fig. 4;) but I prefer to clamp it to a table or ledge by a screw-clamp, l.

This beater has a great simplicity in construction, with unusual efficiency in action, and does the work with great dispatch and thoroughness.

I make no claim to gears for operating egg-beaters, as these are old.

I claim—

1. An egg-beater frame supporting two toothed gears, B D, engaging with each other, the driven gear carrying the beater and being journaled on one side or face of the frame, and the driving-gear being journaled on the opposite side or face of the frame, substantially as set forth.

2. In an egg-beater, the toothed gear D, combined with and operating a vibratory beater whose upper end is adjustably attached to such gear to regulate its extent of throw, and with a guiding-eye on the frame through which the lower free vibrating end of the beater works.

3. In an egg-beater in which the beater describes a vertical path substantially circular, the described means for removing the beater or dasher from its frame or support, consisting in the removable crank-pin E of the driven gear and the open-eyed fulcrum guide-pin on the frame and through which the dasher-rod vibrates and slides when in action.

4. An egg-beater frame supporting two toothed gears, B D, engaging each other, in combination with the vibrating beater adjustably attached to one of the gears to regulate its extent of throw, and with a guiding-eye on the frame through which the lower free end of the beater works, the beater having a coil, H, at its extremity.

5. In an egg-beater, in combination with the driving-gears B D, a wire beater terminating at its lower end in a horizontal coil, and at its other end driven in a circular path by a pin on one of the gears, and an intermediate guide-eye or hole through which the wire has a lengthwise and also a lateral play, substantially as shown and described.

DAVID T. WINTER.

Witnesses:
PHILLIPS T. NELSON,
GEO. HOLMAN.